(12) United States Patent  
Keen

(10) Patent No.: US 8,622,362 B2
(45) Date of Patent: Jan. 7, 2014

(54) SUSPENSION SYSTEM

(75) Inventor: Eric A. Keen, Manhattan, KS (US)

(73) Assignee: Deere & Company, Moline, IL (US)

(*) Notice: Subject to any disclaimer, the term of this patent is extended or adjusted under 35 U.S.C. 154(b) by 416 days.

(21) Appl. No.: 12/787,047

(22) Filed: May 25, 2010

(65) Prior Publication Data

US 2011/0290978 A1  Dec. 1, 2011

(51) Int. Cl.
 *F16M 13/00* (2006.01)

(52) U.S. Cl.
 USPC ..................................... 248/421; 297/344.15

(58) Field of Classification Search
 USPC .................. 248/157, 419, 420, 421, 422, 423; 297/344.12, 344.13, 344.14, 344.15, 297/344.16, 344.17, 344.18, 344.19, 344.2
 See application file for complete search history.

(56) References Cited

U.S. PATENT DOCUMENTS

| | | | |
|---|---|---|---|
| 4,198,025 A | 4/1980 | Lowe et al. | |
| 4,363,377 A | 12/1982 | Van Gerpen | |
| 4,533,106 A | 8/1985 | Stockl | |
| 4,660,234 A | 4/1987 | Schmidt | |
| 4,771,785 A | 9/1988 | Duer | |
| 4,822,094 A * | 4/1989 | Oldfather et al. | 296/65.02 |
| 4,913,482 A | 4/1990 | Hanai et al. | |
| 5,060,959 A | 10/1991 | Davis et al. | |
| 5,169,112 A | 12/1992 | Boyles et al. | |
| 5,833,198 A * | 11/1998 | Graetz | 248/370 |
| 5,941,920 A | 8/1999 | Schubert | |
| 6,059,253 A | 5/2000 | Koutsky et al. | |
| 6,126,132 A | 10/2000 | Maue | |
| 6,286,819 B1 | 9/2001 | Ritchie et al. | |
| 6,354,556 B1 | 3/2002 | Ritchie et al. | |
| 6,371,456 B1 | 4/2002 | Ritchie et al. | |
| 6,371,459 B1 | 4/2002 | Schick et al. | |
| 6,467,748 B1 | 10/2002 | Schick et al. | |
| 6,616,117 B2 | 9/2003 | Gryp et al. | |
| 6,866,236 B2 * | 3/2005 | Mullinix et al. | 248/421 |
| 6,886,650 B2 | 5/2005 | Bremner | |
| 7,039,512 B2 | 5/2006 | Swinbanks et al. | |
| 7,044,553 B2 * | 5/2006 | Ropp | 297/344.15 |
| 7,140,055 B2 | 11/2006 | Bishop et al. | |

(Continued)

FOREIGN PATENT DOCUMENTS

| | | |
|---|---|---|
| DE | 2736242 | 2/1979 |
| EP | 1577156 | 9/2005 |

(Continued)

OTHER PUBLICATIONS

Ferno, Patient Handling Equipment, product brochure (3 pages), USA, date unknown—describes products commercially available since 2005.

(Continued)

*Primary Examiner* — Steven Marsh

(57) ABSTRACT

A suspension system includes a base frame, a carrier frame and a linkage mounted on the base frame and supporting the carrier frame. The linkage includes a first arm pivotally coupled to the frames and a second arm pivotally coupled to the frames and pivotally coupled to the second arm about a linkage pivot axis. A rotary motor has a housing and a shaft which rotates with respect to the housing. The shaft is aligned with the linkage pivot axis. The housing is non-rotatably coupled to the first arm. The shaft is coupled to a transmission which is coupled to the second arm.

22 Claims, 2 Drawing Sheets

(56) References Cited

U.S. PATENT DOCUMENTS

| | | |
|---|---|---|
| 7,185,867 B2 * | 3/2007 | Hill et al. .................. 248/421 |
| 7,418,324 B2 | 8/2008 | Swinbanks et al. |
| 7,568,675 B2 | 8/2009 | Catton |
| 7,694,946 B2 | 4/2010 | Shoemaker et al. |
| 7,712,836 B2 | 5/2010 | Deml |
| 7,770,974 B2 | 8/2010 | Ott et al. |
| 7,818,109 B2 | 10/2010 | Scully |
| 7,822,522 B2 | 10/2010 | Wereley et al. |
| 7,878,312 B2 | 2/2011 | Hiemenz et al. |
| 7,887,033 B2 | 2/2011 | Shoemaker et al. |
| 7,909,404 B2 | 3/2011 | Spangler, Jr. |
| 7,921,973 B2 | 4/2011 | Wereley et al. |
| 7,962,261 B2 | 6/2011 | Bushko et al. |
| 7,988,232 B2 * | 8/2011 | Weber et al. .............. 297/344.15 |
| 2006/0237885 A1 | 10/2006 | Paillard et al. |
| 2006/0272893 A1 | 12/2006 | Foggio et al. |
| 2007/0278025 A1 | 12/2007 | Shoemaker et al. |
| 2008/0088165 A1 | 4/2008 | Deml |
| 2009/0198419 A1 | 8/2009 | Clark |

FOREIGN PATENT DOCUMENTS

| | | |
|---|---|---|
| EP | 1852302 | 11/2007 |
| EP | 1652724 | 1/2008 |
| FR | 2761643 | 10/1998 |
| GB | 2309894 | 8/1997 |
| JP | 9109757 | 4/1997 |
| WO | 20040101311 | 11/2004 |

OTHER PUBLICATIONS

Deere & Co., Prior Production John Deere Seat Suspension (3—pages), no date but shows a seat suspension sold as early as 2001.

European Search Report, received Oct. 14, 2011 (6 pages).

* cited by examiner

SUSPENSION SYSTEM

FIELD OF THE INVENTION

The present invention relates to a suspension system, such as for an active seat suspension system.

BACKGROUND OF THE INVENTION

Agricultural and construction equipment must often be driven over rough terrain. As a result, the operator may experience a bumpy or uncomfortable ride. To minimize the roughness of the operator's ride, operator seats have been equipped with a suspension—typically a passive system consisting of an air spring and hydraulic damper. To improve the ride, active seat suspension systems have been used wherein the hydraulic damper is replaced with a hydraulic cylinder. While significantly improving the ride by actively controlling seat top velocity, the suspension performance is limited by the response speed of the hydraulic system, including the control valve. Additionally, a hydraulic active seat suspension can be noisy due to the hydraulic fluid flow. Such a system also requires high pressure hydraulic lines to enter/exit the operator cab, consumes significant power over the minimum required by the suspension due to the pressure reducing valve, and must be "tuned" to the ride performance of individual vehicles, which requires hardware changes to the hydraulic control valve.

SUMMARY

Accordingly, an object of this invention is to provide a seat suspension system which is quiet and is capable for being actively controlled.

A further object of the invention is to provide such a seat suspension system which does not require high pressure hydraulic lines to enter or exit the operator cab.

A further object of the invention is to provide such a seat suspension system which consumes little power.

A further object of the invention is to provide such a seat suspension system which can be tuned to different vehicle.

These and other objects are achieved by the present invention, wherein

DESCRIPTION OF THE PREFERRED EMBODIMENT

Figure 1:
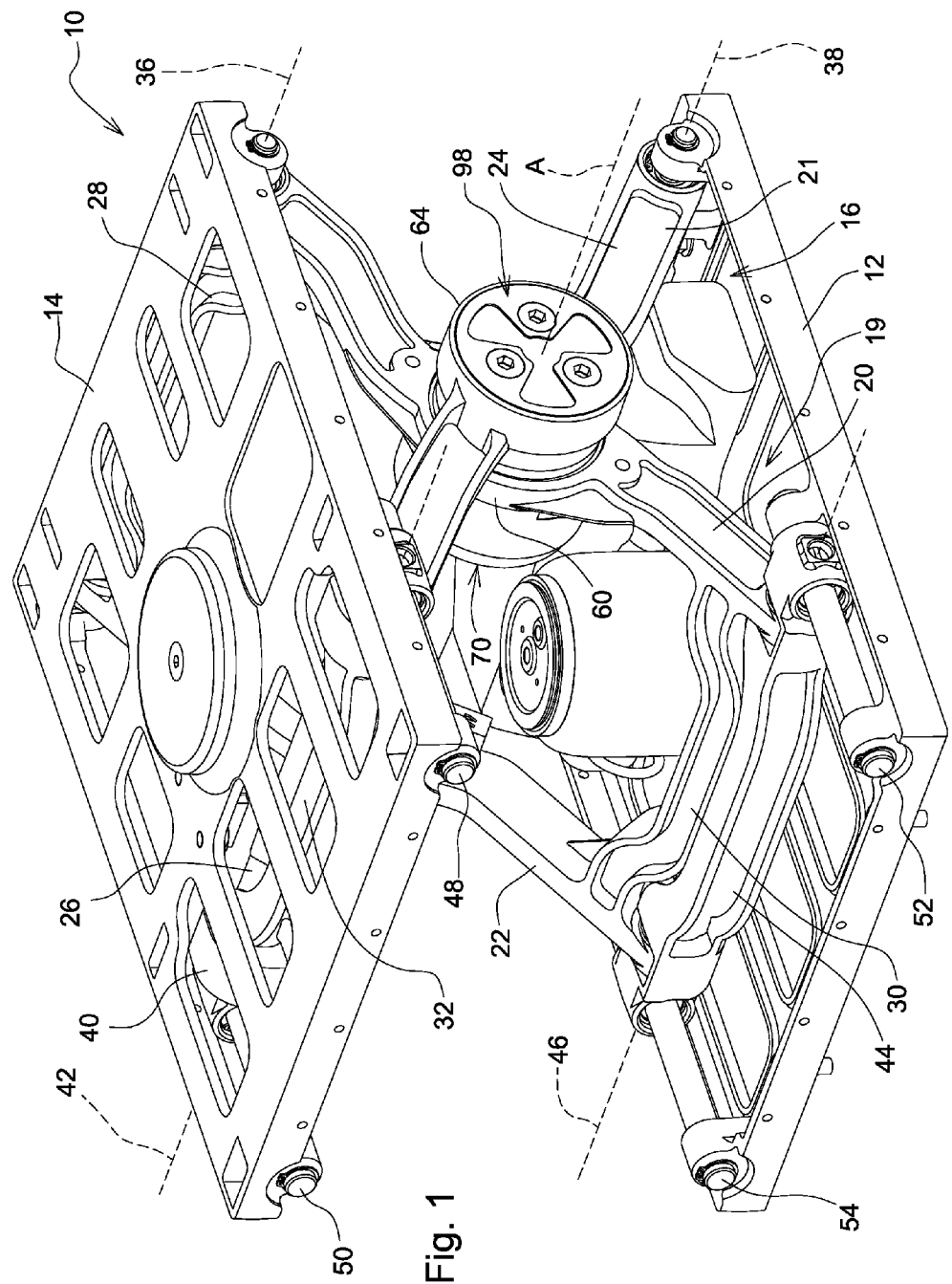
FIG. 1 is a perspective view of a suspension system embodying the invention.
Figure 2:
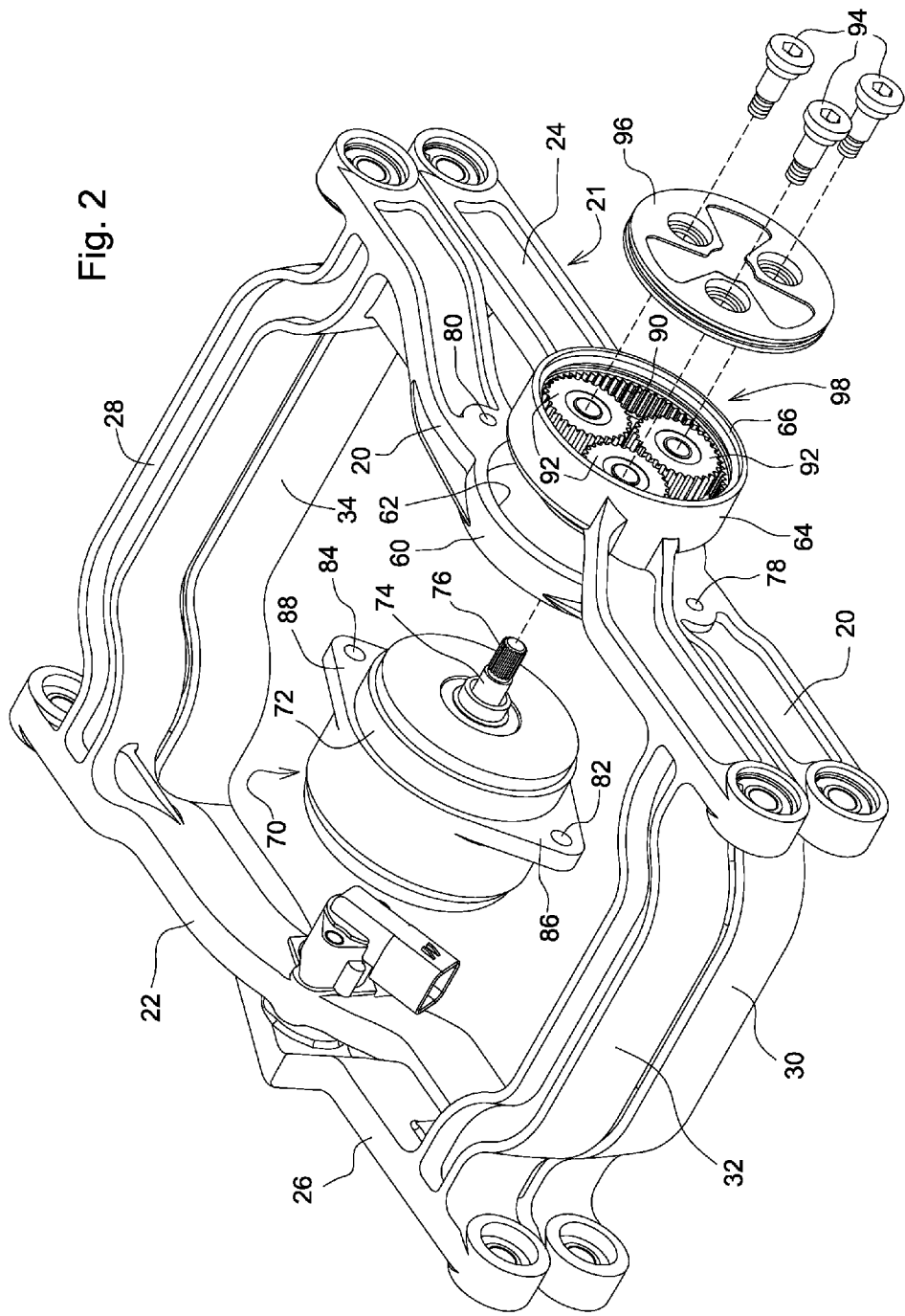
FIG. 2 is an exploded perspective view of the suspension system of FIG. 1 with parts removed for clarity.

Referring to FIG. 1, the suspension system 10 includes a base frame 12 for mounting on a vehicle chassis (not shown) and seat carrier frame 14 which is adapted to support a seat assembly (not shown). The carrier frame 14 is supported with respect to the base frame 12 by a linkage 16, preferably a scissors linkage.

The linkage 16 includes a first link 19 with a pair of first arms 20 and 22, and a second link 21 with a pair of second arms 24 and 26. First arms 20 and 22 are interconnected by an upper cross arm 28 and a lower cross arm 30. Second arms 24 and 26 are interconnected by an upper cross arm 32 and a lower cross arm 34.

The upper ends of first arms 20 and 22 are pivotally coupled to one end of carrier frame 14 at a pivot axis 36. The lower ends of second arms 24 and 26 are pivotally coupled to one end of base frame 12 at a pivot axis 38.

The upper ends of second arms 24 and 26 are pivotally coupled to an upper slide member 40 at a pivot axis 42. The lower ends of first arms 20 and 22 are pivotally coupled to a lower slide member 44 at a pivot axis 46. Upper slide member 40 is slidably supported by upper slide rods 48 and 50 which are fixed to the carrier frame 14. Lower slide member 44 is slidably supported by upper slide rods 52 and 54 which are fixed to the base frame 12. Thus, the lower ends of arms 20 and 22 are pivotally and slidably coupled to base frame 12, and the upper ends of arms 24 and 26 are pivotally and slidably coupled to carrier frame 12.

First arm 20 has a central portion 60 which surrounds a central opening 62. Second arm 24 has a central portion 64 which surrounds a central opening 66.

The suspension system 10 also includes a rotary motor 70, preferably an electric motor. Motor 70 includes an outer housing 72 and an output shaft 74 which projects outwardly from and rotates with respect to the housing 72. Gear teeth are formed on the end of shaft 74 so that the shaft 74 forms a sun gear 76. Motor housing 72 is received by opening 62 and the housing 72 is fixed to the first arm 20 by bolts which extend through bores 78 and 80 in the first arm 20 and which are threaded into bores 82 and 84 formed in flanges or ears 86 and 88 which project from the housing 72.

A ring gear 90 is fixedly mounted in or formed in the inner surface of opening 66 of second arm central portion 64. Three planet gears 92 are mounted within the ring gear 90 for meshing engagement with the sun gear 64 and the ring gear 90. The planet gears are rotatably supported by pins 94 which are carried by planet carrier 96. The sun gear 76, planet gears 92 and the ring gear 90 together form a transmission or gear reduction unit 98 which couples the shaft 74 to the second arm 24. As a result, the first and second links 19 and 21 are pivotally coupled to each other about a link pivot axis A which is aligned with and shares a common axis with the axis of motor shaft 74.

With this system 10, rotation of the sun gear 76 by the motor 70 causes the first arm 20 and the second arm 24 to rotate relative to each other, which in turn causes the carrier frame 14 to move towards and away from the base frame 12.

Thus, this system uses the electric motor 70 and gear reduction unit 98 as the primary power delivery source instead of a hydraulic cylinder. The electric motor 70 and gear reduction unit 98 drive one link of a seat suspension scissors mechanism relative to the other link via the central pivot joint. One scissors link is connected to the motor housing 72 and the other is connected to an output of the gear reduction unit 98. The use of a high reduction ratio in the unit 98 allows the use of a compact and relatively low torque motor in the existing space in a seat suspension. This seat suspension system which is driven by an electric motor is more responsive dynamically due to the response speed of the motor. It also consumes significantly less power (1+kW reduction) than a seat suspension driven by a hydraulic cylinder, since there is no hydraulic pressure reducing valve, and there are no hydraulic lines entering or exiting the operator cab.

While the present invention has been described in conjunction with a specific embodiment, it is understood that many alternatives, modifications and variations will be apparent to those skilled in the art in light of the foregoing description. For example, the motor could be a non-electric motor, such as a hydraulic motor or the like. Accordingly, this invention is intended to embrace all such alternatives, modifications and variations which fall within the spirit and scope of the appended claims.

I claim:

1. A suspension system comprising:
a base frame;
a carrier frame;
a linkage mounted on the base frame and supporting the carrier frame, the linkage comprising a first link pivotally coupled to the frames and a second link pivotally coupled to the frames and pivotally coupled to the first link about a link pivot axis; and
a rotary motor having a housing and a shaft which rotates with respect to the housing, the housing being fixed directly to a central portion of the first link, and the shaft being drivingly coupled to the second link, so that rotation of the shaft relative to the motor housing causes the first and second links to rotate relative to each other and vary a spacing between the carrier frame and the base frame.

2. The suspension system of claim 1, further comprising:
a transmission coupled between the shaft and the second link.

3. The suspension system of claim 1, wherein:
the shaft is aligned with the link pivot axis.

4. The suspension system of claim 1, wherein:
the housing is non-rotatably coupled to the first link.

5. The suspension system of claim 2, wherein:
the transmission is received by an opening formed in the second link.

6. A suspension system comprising:
a base frame;
a carrier frame;
a linkage mounted on the base frame and supporting the carrier frame, the linkage comprising a first link pivotally coupled to the frames and a second link pivotally coupled to the frames and pivotally coupled to the first link about a link pivot axis; and
a rotary motor having a housing and a shaft which rotates with respect to the housing, the housing being non-rotatably fixed directly to a central portion of the first link, and the shaft being drivingly coupled to the second link, and the shaft being aligned with the link pivot axis; and
a transmission coupled between the shaft and the second link, so that rotation of the shaft relative to the motor housing causes the first and second links to rotate relative to each other and vary a spacing between the carrier frame and the base frame.

7. A seat suspension system comprising:
a base frame;
a seat carrier frame;
a linkage mounted on the base frame and supporting the carrier frame, the linkage comprising a first link pivotally coupled to the frames and a second link pivotally coupled to the frames and pivotally coupled to the first link about a link pivot axis; and
a rotary motor having a housing and a shaft which rotates with respect to the housing, the housing being non-rotatably fixed directly to a central portion of the first link, and the shaft being drivingly coupled to the second link, and the shaft being aligned with the link pivot axis, so that rotation of the shaft relative to the motor housing causes the first and second links to rotate relative to each other and vary a spacing between the seat carrier frame and the base frame.

8. The suspension system of claim 7, further comprising:
a transmission coupled between the shaft and the second link.

9. The suspension system of claim 8, wherein:
the transmission comprises a planetary transmission having a sun gear fixed to the shaft, a ring gear fixed to the second link, and a plurality of planet gears meshing with the sun gear and the ring gear.

10. The suspension system of claim 7, wherein:
the shaft is aligned with the link pivot axis.

11. The suspension system of claim 7, wherein:
the housing is non-rotatably coupled to the first link.

12. The suspension system of claim 8, wherein:
the transmission is received by an opening formed in the second link.

13. A seat suspension system comprising:
a base frame;
a seat carrier frame;
a linkage mounted on the base frame and supporting the carrier frame, the linkage comprising a first link pivotally coupled to the frames and a second link pivotally coupled to the frames and pivotally coupled to the first link about a link pivot axis, the first link having a first central opening therein, and the second link having a second central opening therein; and
a rotary motor having a housing and a shaft which rotates with respect to the housing, the housing being fixed to the first link and received by the first opening, and the shaft being drivingly coupled to the second link, and the shaft being aligned with the link pivot axis, so that rotation of the shaft relative to the motor housing causes the first and second links to rotate relative to each other and vary a spacing between the seat carrier frame and the base frame; and
a transmission coupled between the shaft and the second link, the transmission being received by the second opening.

14. The suspension system of claim 13, wherein:
the transmission comprises a planetary transmission having a sun gear fixed to the shaft, a ring gear fixed to the second link, and a plurality of planet gears meshing with the sun gear and the ring gear.

15. The suspension system of claim 13, wherein:
the housing is non-rotatably coupled to the first link.

16. A suspension system comprising:
a base frame;
a carrier frame;
a linkage mounted on the base frame and supporting the carrier frame, the linkage comprising a first link pivotally coupled to the frames and a second link pivotally coupled to the frames and pivotally coupled to the first link about a link pivot axis;
a rotary motor having a housing and a shaft which rotates with respect to the housing, the housing being coupled to the first link, and the shaft being drivingly coupled to the second link, so that rotation of the shaft relative to the motor housing causes the first and second links to rotate relative to each other and vary a spacing between the carrier frame and the base frame; and
a transmission coupled between the shaft and the second link, the transmission comprises a planetary transmission having a sun gear fixed to the shaft, a ring gear fixed to the second link, and a plurality of planet gears meshing with the sun gear and the ring gear.

17. A suspension system comprising:
a base frame;
a carrier frame;
a linkage mounted on the base frame and supporting the carrier frame, the linkage comprising a first link pivotally coupled to the frames and a second link pivotally coupled to the frames and pivotally coupled to the first link about a link pivot axis; and
a rotary motor having a housing and a shaft which rotates with respect to the housing, the housing being coupled to the first link, and the shaft being drivingly coupled to the second link, so that rotation of the shaft relative to the motor housing causes the first and second links to rotate relative to each other and vary a spacing between the carrier frame and the base frame, the housing being received by an opening formed in the first link.

18. A seat suspension system comprising:
a base frame;
a seat carrier frame;
a linkage mounted on the base frame and supporting the carrier frame, the linkage comprising a first link pivotally coupled to the frames and a second link pivotally coupled to the frames and pivotally coupled to the first link about a link pivot axis; and
a rotary motor having a housing and a shaft which rotates with respect to the housing, the housing being non-rotatably coupled to the first link, and the shaft being drivingly coupled to the second link, and the shaft being aligned with the link pivot axis, so that rotation of the shaft relative to the motor housing causes the first and second links to rotate relative to each other and vary a spacing between the seat carrier frame and the base frame; and
a transmission coupled between the shaft and the second link, the transmission comprising a planetary transmission having a sun gear fixed to the shaft, a ring gear fixed to the second link, and a plurality of planet gears meshing with the sun gear and the ring gear.

19. A seat suspension system comprising:
a base frame;
a seat carrier frame;
a linkage mounted on the base frame and supporting the carrier frame, the linkage comprising a first link pivotally coupled to the frames and a second link pivotally coupled to the frames and pivotally coupled to the first link about a link pivot axis; and
a rotary motor having a housing and a shaft which rotates with respect to the housing, the housing being non-rotatably coupled to the first link, and the shaft being drivingly coupled to the second link, and the shaft being aligned with the link pivot axis, so that rotation of the shaft relative to the motor housing causes the first and second links to rotate relative to each other and vary a spacing between the seat carrier frame and the base frame, the housing being received by an opening formed in the first link.

20. A suspension system comprising:
a base frame;
a carrier frame;
a rotary motor having a housing and a shaft which rotates with respect to the housing; and
a linkage mounted on the base frame and supporting the carrier frame, the linkage comprising a first link pivotally coupled to the frames and a second link pivotally coupled to the frames and pivotally coupled to the first link about a link pivot axis, the first link being non-rotatably attached to the motor housing, and the shaft being drivingly coupled to the second link, so that rotation of the shaft relative to the motor housing causes the first and second links to rotate relative to each other and vary a spacing between the carrier frame and the base frame.

21. The suspension system of claim 20, wherein:
the link pivot axis extends though the motor.

22. The suspension system of claim 20, wherein:
the link pivot axis extends though the motor shaft.

* * * * *